(12) United States Patent
Hong et al.

(10) Patent No.: US 10,459,978 B2
(45) Date of Patent: Oct. 29, 2019

(54) DISTRIBUTED GRAPH PROCESSING SYSTEM THAT SUPPORT REMOTE DATA READ WITH PROACTIVE BULK DATA TRANSFER

(71) Applicant: Oracle International Corporation, Redwood Shores, CA (US)

(72) Inventors: Sungpack Hong, Palo Alto, CA (US); Thomas Manhardt, Foster City, CA (US); Jan van der Lugt, San Francisco, CA (US); Merijn Verstraaten, Noord-Holland (NL); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 688 days.

(21) Appl. No.: 14/678,358

(22) Filed: Apr. 3, 2015

(65) Prior Publication Data

US 2016/0292303 A1 Oct. 6, 2016

(51) Int. Cl.
*G06F 17/30* (2006.01)
*G06F 16/901* (2019.01)
*G06F 16/25* (2019.01)

(52) U.S. Cl.
CPC ........ *G06F 16/9024* (2019.01); *G06F 16/254* (2019.01)

(58) Field of Classification Search
CPC .................... G06F 17/30958; G06F 17/30563
See application file for complete search history.

(56) References Cited

U.S. PATENT DOCUMENTS

| | | | |
|---|---|---|---|
| 8,949,489 B1 * | 2/2015 | Merchant | G06F 3/0659 710/36 |
| 2003/0084045 A1 | 5/2003 | Anderson | |
| 2013/0024479 A1 * | 1/2013 | Gong | G06F 9/5066 707/798 |

(Continued)

OTHER PUBLICATIONS

Xin et al., "GraphX Resilient Distributed Graph System on Spark", dated Jun. 23, 2013, Proceedings of the First International Workshop on Graph Data Management, 6 Pages.

(Continued)

*Primary Examiner* — Etienne P Leroux
*Assistant Examiner* — Husam Turki Samara
(74) *Attorney, Agent, or Firm* — Hickman Palermo Becker Bingham LLP; Daniel D. Ledesma

(57) ABSTRACT

Techniques for generating and transferring bulk messages from one computing device to another computing device in a cluster are provided. Each computing device in a cluster is assigned a different set of nodes of a graph. A first computing device may be assigned a particular node that is neighbors with multiple other nodes that are assigned to one or more other computing devices in the cluster. When processing graph-related code at the first computing device, information about the neighbors may be required. The first computing device receives a bulk message from one of the other computing devices. The bulk message contains information about at least a subset of the neighbors. Therefore, the first computing device is not required to send multiple messages for information about the subset of neighbors. In fact, the first computing device is not required to send any message for the information.

26 Claims, 9 Drawing Sheets

(56) References Cited

U.S. PATENT DOCUMENTS

| | | | |
|---|---|---|---|
| 2014/0047140 A1 | 2/2014 | Otenko | |
| 2015/0006606 A1* | 1/2015 | Fleury | G06F 9/546 709/201 |
| 2016/0140152 A1 | 5/2016 | Sevenich | |
| 2016/0179883 A1* | 6/2016 | Chen | G06F 17/30292 707/714 |
| 2016/0203235 A1* | 7/2016 | Chakrabarti | G06F 17/30958 707/798 |
| 2016/0205170 A1* | 7/2016 | Wiseman | H04L 67/025 709/224 |
| 2016/0232037 A1 | 8/2016 | Depner et al. | |
| 2016/0342445 A1 | 11/2016 | Lugt et al. | |

OTHER PUBLICATIONS

Nelson et al., "Latency-Tolerant Software Distributed Shared Memory", Technical Report UW-CSE-14-05-03, dated 2014, 13 pages.
Malewicz et al., "Pregel: A System for Large-Scale Graph Processing", SIGMOD, ACM, dated Jun. 2010, 11 pages.
Low et al., "GraphLab: A New Framework for Parallel Machine Learning", dated Jun. 25, 2010, 10 pages.
Karypis, et al., "Multilevel Algorithms for Multi-Constraint Graph Partitioning", Technical Report #98-019, dated May 5, 1998, 25 pages.
U.S. Appl. No. 14/619,414, filed Feb. 11, 2015, Office Action, dated May 3, 2016.
Lugt, U.S. Appl. No. 14/718,430, filed May 21, 2015, Office Action, dated Jan. 11, 2017.
U.S. Appl. No. 14/619,414, filed Feb. 11, 2015, Notice of Allowance, dated Aug. 23, 2016.
Grappa, "Scaling Data-intensive Applications on Commodity Clusters", http://grappa.io/, last viewed on May 6, 2015, 4 pages.
Dato.com, "GraphLab Create User Guide", Introduction, 1 page, last viewed on May 6, 2015, 1 page.
Lugt, U.S. Appl. No. 14/718,430, filed May 21, 2015, Notice of Allowance, dated Apr. 20, 2017.
Open MP Application Program, http://www.openmp.org/mpdocuments/OpenMP_4.0_RC2.pdf dated 2013, 418 pages. http://docs.oracle.com/javase/7/docs/api/java/util/concurrent/ForkJoinPool.html, "Class ForkJoinPool", last viewed May 20, 2015, 11 pages.
Giraph "Introduction to Apache Giraph", http://giraph.apache.org/intro.html, last viewed on May 6, 2015, 2 pages.

* cited by examiner

DISTRIBUTED GRAPH PROCESSING SYSTEM THAT SUPPORT REMOTE DATA READ WITH PROACTIVE BULK DATA TRANSFER

TECHNICAL FIELD

The present disclosure relates to distributed graph processing systems and, more particularly, to transferring bulk data messages between computing devices in a cluster.

BACKGROUND

Graph analysis is an important type of data analytics where the underlying data-set is modeled as a graph. Since such a graph representation captures relationships between data entities, applying graph analysis procedures can provide valuable insight about the original data-set to the user. Examples of popular graph analysis procedures are Community Detection, PageRank, Finding Shortest Paths, and Link Prediction.

Many graph data sets are so large that a single graph data set is unable to fit in a single machine's address space. Instead, a graph instance is distributed among computing nodes in a cluster of computing nodes (or "cluster device"). In this scenario, graph analysis is performed by exploiting one or more CPUs of each cluster device while the cluster devices communicate with each other through a high-bandwidth network.

A graph algorithm may be expressed as multiple iterations of computation kernels. A kernel may look like the following pseudo-code:

```
foreach(n: G.nodes)      // for every vertex n in graph G
    foreach(t: n.nbrs)   // for every neighbor vertex t of n
        n.foo += t.bar   // sum-up t.bar into n.foo
```

A straightforward implementation of the above pseudo-code in a distributed environment can be challenging because the above pattern requires one cluster device pulling or reading data from other cluster nodes. In one approach, each time a first cluster device requires a neighbor of a graph node from a second cluster device, the first cluster device sends a request message to the second cluster device. Therefore multiple messages are generated and passed between cluster devices. Furthermore, multiple graph nodes assigned to the first cluster device may share a common neighbor. Thus, the first cluster device may generate and send a request message for each graph node that has the common neighbor. Therefore, if there are ten graph nodes that are assigned to the first cluster device and that are connected to a particular graph node assigned to the second cluster device, then the first cluster device sends ten request messages to the second cluster device for the same data item.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
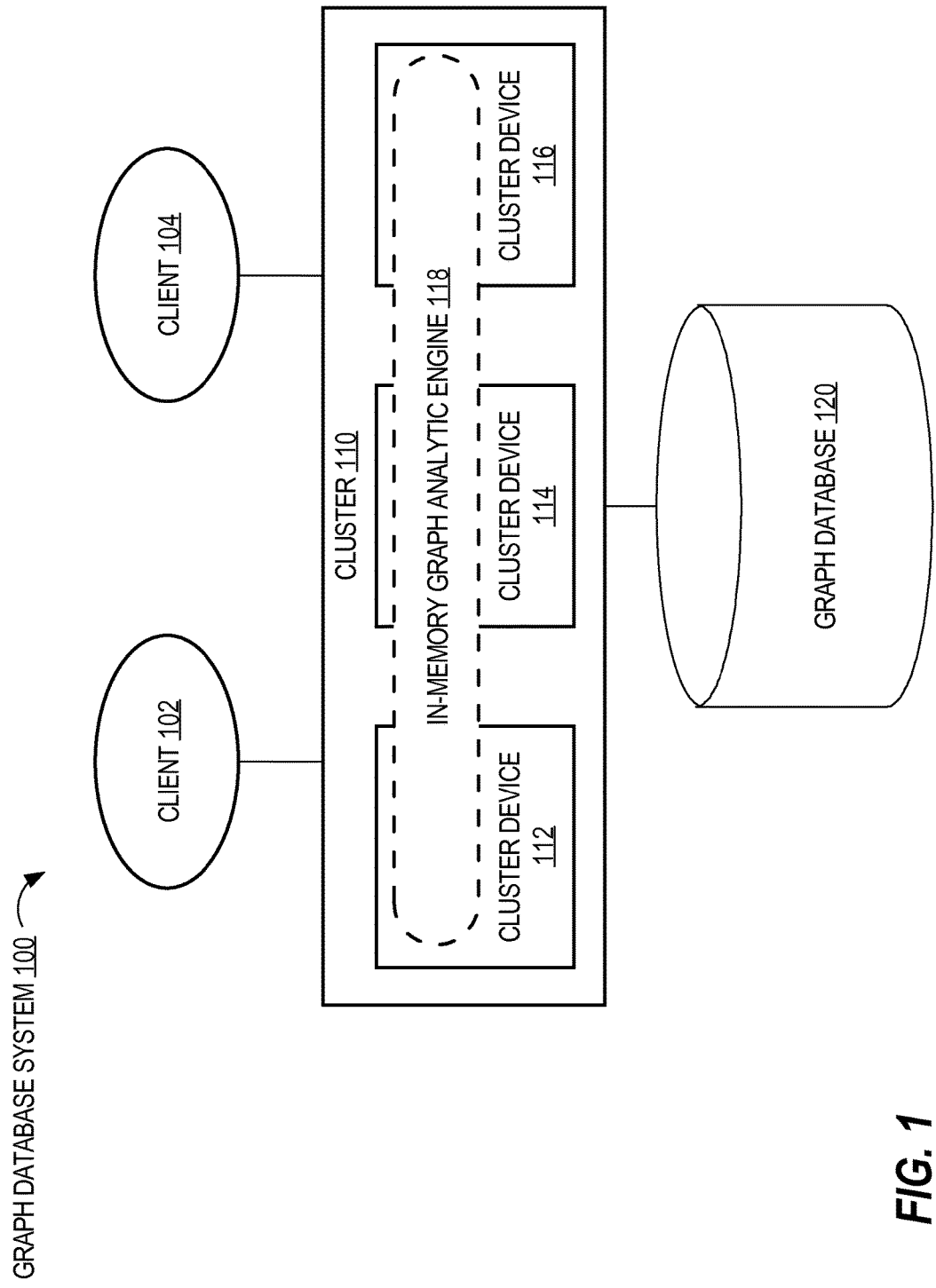
FIG. 1 is a block diagram that depicts an example graph database system, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques for generating and transferring bulk messages from one computing device to another computing device in a cluster are provided. A bulk message contains information about multiple nodes in a graph. Each computing device in a cluster is assigned a different set of nodes of a graph. A first computing device may be assigned a particular node that is neighbors with multiple other nodes that are assigned to one or more other computing devices in the cluster. When processing graph-related code at the first computing device, information about the neighbors may be required to perform a graph analysis operation. The first computing device receives a bulk message from one of the other computing devices. The bulk message contains information about at least a subset of the neighbors. Therefore, the first computing device is not required to send multiple messages for information about the subset of neighbors. In fact, the first computing device may not be required to send any message for the information.

Database Overview

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs. Database applications interact with a database server by submitting to the database server commands that cause the database server to perform operations on data stored in a database. A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types.

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

Graph Database System Overview

FIG. 1 is a block diagram that depicts an example graph database system 100, in an embodiment. Graph database system 100 includes a graph database 120 that stores graph data, a cluster 110 of computing devices that implements an in-memory graph analytic engine 118, and clients 102 and 104 that send requests to and receive responses from graph analytic engine 118. While only two clients 102-104 are depicted, graph database system 100 may support many more clients. Also, while FIG. 1 depicts client 102-104 as directly connected to graph analytic engine 118, clients 102-104 may be, instead, communicatively coupled to graph analytic engine 118 over one or more networks (not shown). Clients 102 and 104 may be in the same or different networks relative to each other.

In an embodiment, each of cluster devices 112-116 is assigned to and stores a different set of a graph. For example, if graph nodes are assigned a unique number in memory starting at '0,' then cluster device 112 may be assigned nodes 0 to 10,000, cluster device 114 may be assigned nodes 10,001 to 30,000, and cluster device 116 may be assigned nodes 30,001 to 96,026.

Graph analytic engine 118 is configured to perform one or more graph-related operations on a graph. Because different portions of graph data of the graph are stored on different cluster devices and graph nodes assigned to one cluster device may be connected to graph nodes assigned to another cluster device, graph analytic engine 118 executing on one cluster device may be configured to request node and/or edge information from other cluster devices in order to perform a graph-related operation.

Graph Data

As noted previously, graph database 120 stores graph data about one or more graphs, each comprising multiple nodes and edges. If graph database 120 stores multiple graphs, then each graph represents a different set of data that is to be treated separately for graph analysis purposes. For example, one graph set may reflect relationships among users in one social network while another graph set may reflect relationships among users in another social network. As another example, one graph set may reflect relationships among users in a social network while another graph set may reflect connections among computing devices in a network.

Graph database 120 may be a relational database or an object database. For example, one node table in graph database 120 may include a row for each node in a graph. (Graph database 120 may store a different node table for each graph represented in the graph data.) Each column in the node table may correspond to a different attribute or property of the node, such as a name, an age, and a date, depending on the type of object the nodes represent. A node table may include multiple rows for a single node. For example, a node table may have two columns: a node ID column and a node property column that is not specific to any particular property type. If a single node has multiple properties, then multiple rows are used to reflect those properties.

Graph database 120 may also store an edge table that corresponds to the node table. Each row in the edge table corresponds to a different edge in the graph and each column in the edge table corresponds to a node that is connected to by another node through the corresponding edge. Thus, the edge table may have at least two columns, one for each of two nodes. The edge table may also have additional columns, each additional column corresponding to an attribute or characteristic about the corresponding edge.

Nodes in a graph may represent one of many different types of objects while edges that connect two nodes in the graph may represent one of many different types of relationships between the objects. Embodiments are not limited to any particular type of object or type of relationship.

For example, nodes in a graph may represent user accounts maintained by a social network that is provided by a social network provider, such as Facebook, Google+, LinkedIn, and Twitter. An edge in such a graph may represent that the two connecting nodes have established a relationship with each other or that one of the connecting nodes has decided to "follow" the other node (as in Twitter).

As another example, nodes in a graph may represent a network, such as the Internet, and edges in the graph may represent that computing devices are physically coupled to each other.

When a graph is stored in memory from graph database 120, the names or identifiers of each node may be converted to a different value. For example, if a node represents a user account (e.g., "johnsmith1986") maintained by a social network provider, then the user identifier that identifies that user account for the social network provider may be mapped to another value, such as 2032, indicating that the user account is at least one of 2032 (or 2033) user accounts in the graph. Thus, the data and, optionally, the format of a graph that is stored in graph database 120 may be different than the data and format of the corresponding graph in memory. Furthermore, the values of node identifiers in memory may be later mapped back to their respective original values that identify real-world objects, such as email addresses, IP addresses, MAC addresses, or social network account identifiers.

In-Memory Graph Analytic Engine

In-memory graph analytic engine 118 performs one or more graph analytic operations on a "graph instance" that is loaded from graph database 120 and stored in-memory of one or more computing devices (or nodes). A graph instance is an in-memory version of a graph whose nodes and edges are stored in graph database 120. A graph instance is considered a snapshot of a graph at a particular point in time. Thus, a graph instance is associated with a transaction identifier, a timestamp, or an internal system clock number, such as a system change number (SCN). If another graph instance is generated based on another version of the same graph that includes one or more subsequent changes (e.g., an insertion or deletion of a node), then that graph instance is associated with a different transaction ID, timestamp, or SCN. While embodiments are not limited to any type of value that is used to indicate a particular point in time, the following examples are in the context of a transaction ID.

In-memory graph analytic engine 118 may be implemented in hardware, software, or any combination of hardware and software. For example, in-memory graph analytic engine 118 may execute on one or more nodes, each comprising one or more processors and memory (such as random access memory (RAM)) that stores instructions that are executed by the one or more processors. Even though FIG. 1 depicts a single element for in-memory graph analytic engine 118, in-memory graph analytic engine 118 may be implemented on a single computing device or on multiple computing devices.

In-memory graph analytic engine 118 functions as a server for clients 102 and 104. Each client connects to in-memory graph analytic engine 118 and requests certain types of tasks, such as loading a graph into memory and performing graph analytic operations, including returning information about a graph, adding nodes and edges to a graph, deleting nodes and edges from a graph, and updating properties or attributes of nodes/edges of a graph. Thus, in-memory graph analytic engine 118 translates client requests into graph operations that a storage device that stores graph database 120 recognizes or is configured to process.

Client requests (e.g., from clients 102 and 104) may conform to a standard or proprietary set of APIs, such as BluePrint API.

Each graph stored in graph database 120 may be associated with a graph identifier that uniquely identifies the graph relative to other graphs that are also stored in graph database 120. Thus, in-memory graph analytic engine 118 may translate a graph name (that is specified or otherwise indicated in a client request) to a graph identifier.

In response to receiving a client request, in-memory graph analytic engine 118 sends a retrieval request to graph database 120 for a particular graph. The retrieval request may indicate (in addition to a graph identifier) that all the nodes and edges of a particular graph are to be retrieved. Alternatively, the retrieval request may indicate one or more filter criteria that are used to filter out nodes and/or edges from the graph that is stored in graph database 120. For example, one filter criterion may be age of a node, such as all nodes that were added to the graph more than two days ago. Thus, any nodes older than two days are not part of the corresponding graph instance (i.e., that is created in-memory). Thus, a graph instance may not reflect all the nodes and edges of the graph at the particular time that is associated with the graph instance.

Filter criteria may be applied by graph database 120 or by in-memory graph analytic engine 118. For example, if a filter criterion is "NODE.age>10", then in-memory graph analytic engine 118 may request graph database 120 for all nodes that have an age attribute value that is greater than 10. As another example, filter criteria for an edge may be "source.color=blue and destination.color=red", in which case in-memory graph analytic engine 118 applies the filter criteria while creating a graph instance by checking the value of the attribute 'color' of each end of each edge. Applying such filter criteria may require a join and in-memory graph analytic engine 118 may be much more efficient than graph database 120 at performing joins.

Instead of creating a graph instance in memory in response to a client request, in-memory graph analytic engine 118 may load a graph instance prior to any client request for data regarding the corresponding graph. For example, upon startup, in-memory graph analytic engine 118 may load one or more graph instances, such as those graphs that are most frequently requested by clients.

Example Graph Instance

Figure 2:
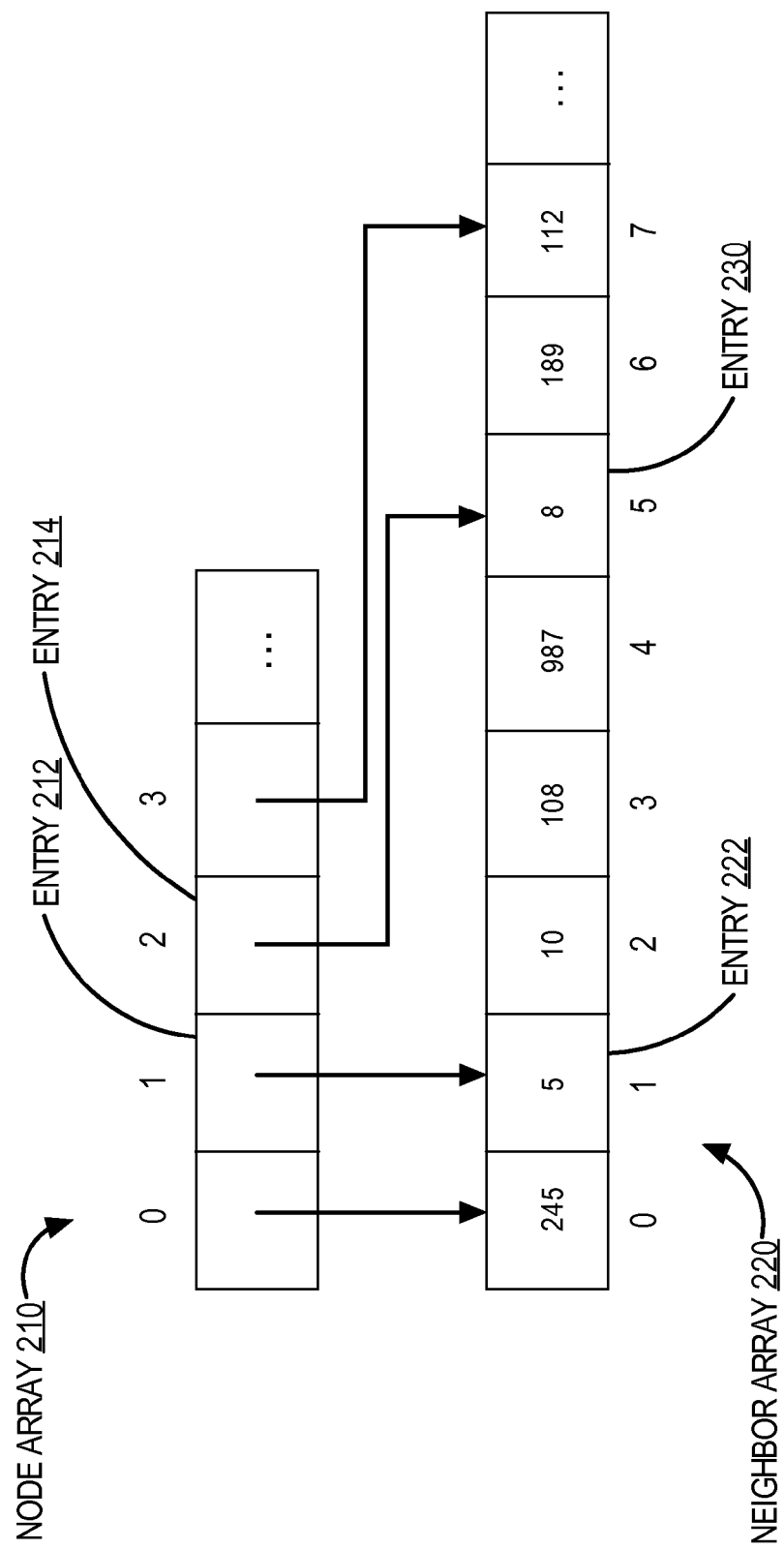
FIG. 2 is a block diagram that depicts an in-memory representation of a graph, in an embodiment.

A graph may be represented in any number of ways. Embodiments are not limited to any particular representation. FIG. 2 is a block diagram that depicts two arrays of a graph instance: a node array 210 and a neighbor array 220, in an embodiment. Each entry in node array 210 corresponds to a different node in a graph and includes a value (e.g., an index, a reference, or a pointer) that is used to identify an entry in neighbor array 220. For example, if a user of a social networking service has 1029 friends (or registered contacts) and a node in node array 210 corresponds to that user, then neighbor array 220 would include 1029 entries, one for each "friend" of the user.

In an embodiment, each of one or more entries in node array 210 includes one or more data values that indicate information about the corresponding node. For example, an entry in node array 210 includes a data value for one or more properties of the corresponding node. As noted previously, a property of a node may be a name, an age, a date, a time, a salary, or a description of some kind. In a related embodiment, the one or more data values are stored in a separate data structure (e.g., an array) from node array 210, such as a column-oriented array that "parallels" node array 210. For example, another array stores a name for each node in node array 210. Each position in the other array corresponds to a different position in node array 210. For example, the third position in the other array includes a name of the node corresponding to the third position in node array 210.

The "pointed-to" entry in neighbor array 220 that is "pointed to" by a "pointing" entry in node array 210 indicates that the node represented by the "pointed-to" entry is a "neighbor" of the node represented by the "pointing" entry. For example, entry 212 in node array 210 may include an index value (e.g., '1') that corresponds to entry 222 in neighbor array 220. Thus, with respect to entry 222, entry 222 is a "pointing" entry. Entry 212 is the second position in node array 210. If each node in a graph (that comprises N nodes) is given a unique value from 0 to N−1, then entry 212 corresponds to node '1' which can be used to index into node array 210 at the second position. Entry 222 includes the value '5', indicating that it can be used to index into node array 210 at the sixth position.

The neighbors of a particular node indicated in node array 210 may be determined based on (1) the "pointed-to" entry (in neighbor array 220) that the "pointing" node indicates (or references) and (2) the entry (in neighbor array 220) that the node subsequent to the "pointing" node in node array 210 indicates (or references). For example, entry 212 indicates (or references) entry 222 in neighbor array 220. Entry 214 indicates (or references) entry 230. All entries between entry 222 and entry 230 (including entry 222 and excluding entry 230) are neighbors of entry 212. Thus, the neighbors of the node indicated by entry 212 are nodes 5, 10, 108, and 987.

The set of neighbors that are indicated in neighbor array 220 and that correspond to a particular node in node array 210 is referred to herein as the "neighbor list" of the particular node. Each neighbor list is indicated by a contiguous set of entries in neighbor array 220.

In an embodiment, each neighbor list in neighbor array 220 is sorted by node value. If each neighbor list in neighbor array 220 is not sorted initially, then each neighbor list may be ordered before graph analysis operations are performed on the graph instance, such as identifying common neighbors or counting triangles.

In a related embodiment, an entry in node array 210 includes two values that are used to identify neighbors of the entry. For example, entry 212 may include the values '1' and '4'. The neighbor list of entry 212 may then be determined as the nodes between (and including) the second entry and the fifth entry in neighbor array 220.

In embodiments where different portions of a graph instance are stored in different computing devices of a cluster, each cluster device (e.g., cluster device 112) may store a node array and a neighbor array for the nodes indicated in the node array. For example, each cluster device stores (1) a node array of nodes assigned to the cluster device and (2) a different neighbor array of nodes that are neighbors of the nodes indicated in the node array.

Bulk Message Overview

Figure 3:
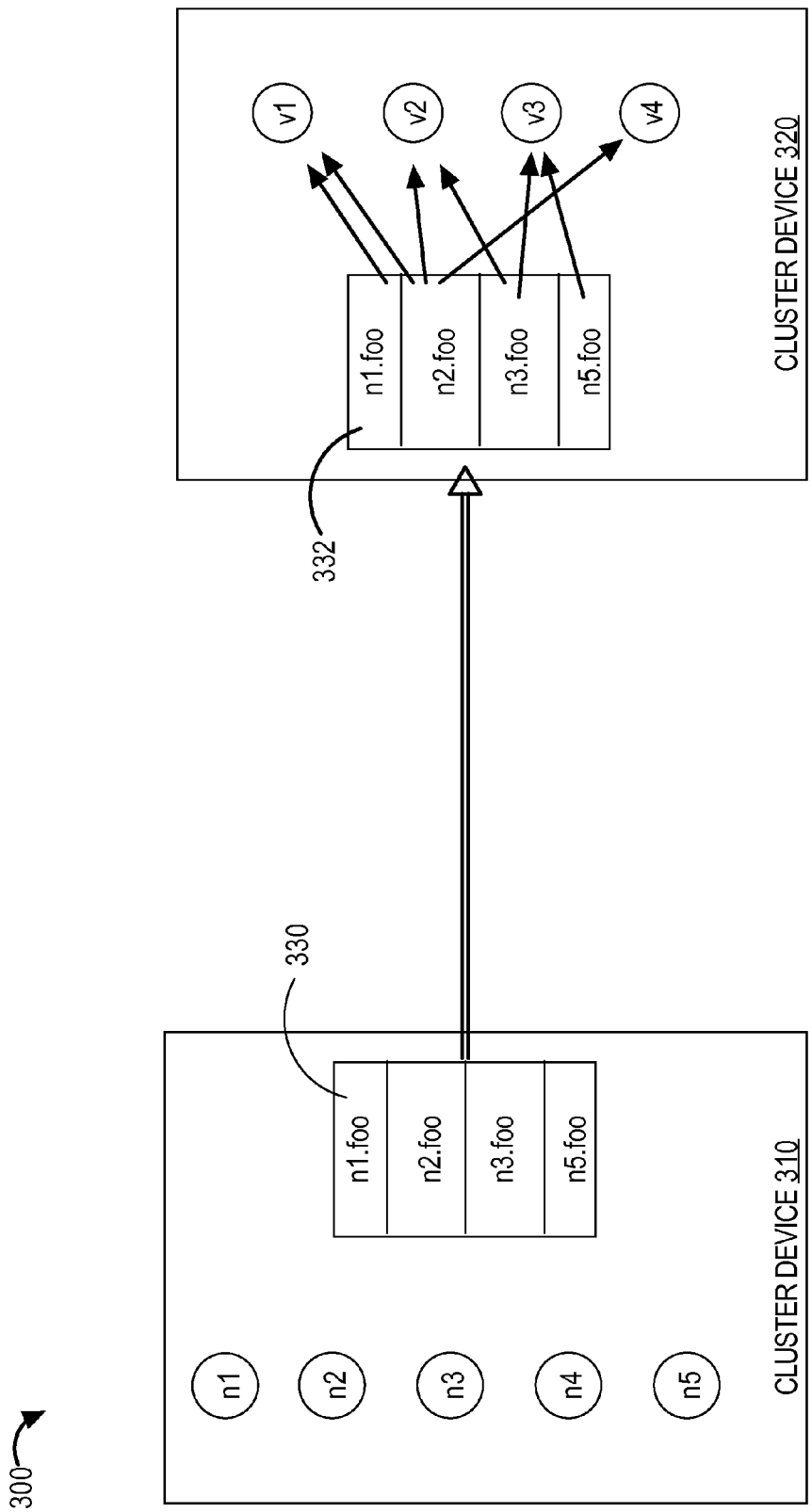
FIG. 3 is a block diagram that depicts a cluster system and a bulk message, in an embodiment.

FIG. 3 is a block diagram that depicts a simple cluster system 300 comprising two cluster devices 310-320 and bulk message 330 passing between them, in an embodiment. Cluster device 310 is assigned graph nodes n1-n5 and cluster device 320 is assigned graph nodes v1-v4, some of which are neighbors of a subset of graph nodes n1-n5. Cluster device 310 generates bulk message 330 that includes a node property value for four of the five graph nodes n1-n5. Cluster device 310 sends bulk message 330 to cluster device 320. Cluster device 320 may include one or more processors, each of which access bulk message 332, which is a copy of bulk message 330.

Processing of graph node v1 requires data from the first two entries in bulk message 330. Thus, at least graph nodes n1 and n2 are incoming edges of graph node v1. Processing of graph node v2 requires data from the middle two entries in bulk message 330; processing of graph node v3 requires data from the last two entries in bulk message 330; and processing of graph node v4 requires data from the second entry in bulk message 330.

The following description provides more details regarding how "sending" cluster devices generate bulk messages and how "receiving" cluster devices process bulk messages.

In an embodiment, cluster device 310 generates bulk message 330 without receiving a request for any of the data items in bulk message 330 from cluster device 320, or any other computing device. Thus, cluster device 310 generates bulk message 330 "proactively." Additional details about how a bulk message may be created are provided below.

Graph Loading

The largeness of a graph may require a graph being distributed over multiple cluster devices 112-116 in cluster 110. Thus, when loading a graph into cluster 110 for graph processing, cluster device 112 reads in one portion of a graph from graph database 120, cluster device 114 reads in a different portion of the graph from graph database 120, and cluster device 116 reads in another portion of the graph from graph database 120. Alternatively, one cluster device reads in all graph data and, before the entire graph is stored in memory of the client device (since the graph may be too large), determines which portions of the graph will be assigned to each other cluster devices, and transmits those portions to the other cluster devices accordingly.

In an embodiment, each cluster device stores neighbor location data that indicates, for each neighbor of a node, on which cluster device the neighbor is stored. If a neighbor is stored locally, then the neighbor location data may or may not include an entry for the neighbor.

Figure 4A:
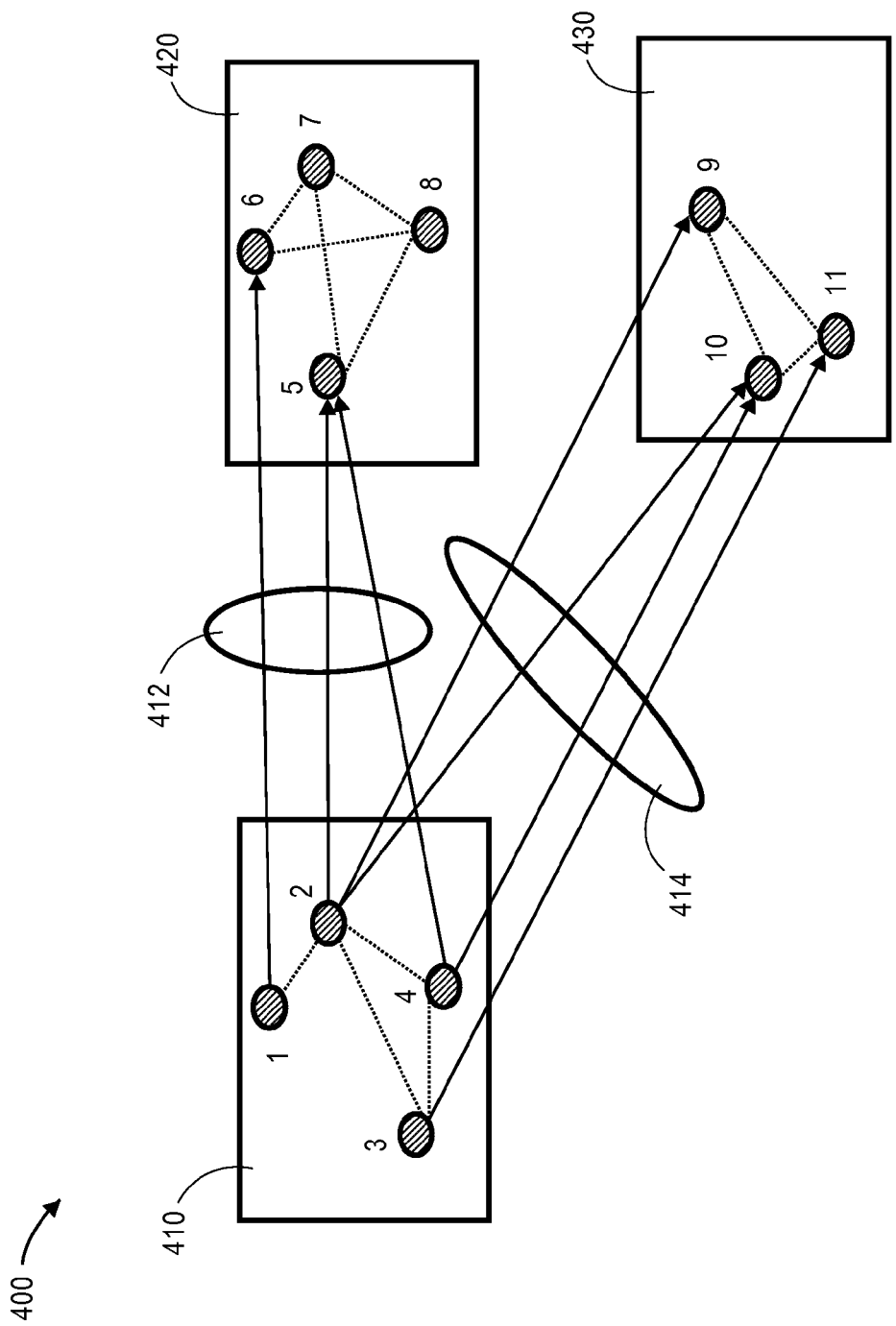
FIG. 4A is a block diagram that depicts a distribution of an example graph instance in a cluster, in an embodiment.

FIG. 4A is a block diagram that depicts a distribution of an example graph instance in a cluster 400, in an embodiment. Cluster 400 comprises cluster devices 410-430. Cluster device 410 is assigned nodes 1-4, cluster device 420 is assigned nodes 5-8, and cluster device 430 is assigned nodes 9-11. Thus, each cluster device in cluster 400 may store non-neighbor information about the nodes assigned to the cluster device, such as node property data and, optionally edge property data that indicates information about properties of edges with neighbors of the nodes assigned to the cluster device. For example, cluster device 410 may store edge information 412 about the edges between nodes 1, 2, and 4 (which are assigned to cluster device 410) and nodes 5 and 6 (which are assigned to cluster device 420). Additionally or alternatively, cluster device 420 stores edge information 412.

Similarly, cluster device 410 may store edge information 414 about edges between nodes 2-4 (which are assigned to cluster device 410) and nodes 9-11 (which are assigned to cluster device 430).

In an embodiment, each cluster device creates and stores data that indicates which nodes are assigned to the cluster device and are neighbors of nodes that are assigned to other cluster devices. For example, based on the example in FIG. 4A, cluster device 410 creates and stores the following table:

TABLE A

| To Machine | Local Vertex List | Remote Vertex List |
|---|---|---|
| #2 | 1, 2, 4 | 5, 6 |
| #3 | 2, 3, 4 | 9, 10, 11 |

Table A is an edge information table that indicates outgoing edges of nodes assigned to cluster device 410. The first column of Table A indicates a cluster device that is assigned nodes that are neighbors of some nodes assigned to cluster device 410. In this example, machine #2 corresponds to cluster device 420 and machine #3 corresponds to cluster device 430.

The second column identifies nodes that are assigned to cluster device 410 and that are neighbors of nodes assigned to other cluster devices. For example, nodes 1, 2, and 4 are nodes assigned to cluster device 410 and are neighbors of nodes assigned to cluster device 420.

The third column identifies nodes that are assigned to another cluster device and that are neighbors of nodes assigned to cluster device 410. For example, nodes 5 and 6 are assigned to cluster device 420 and are neighbors of nodes 1, 2, and 4, which are assigned to cluster device 410.

In this example, the list of vertices is maintained in sorted order. When two cluster devices are exchanging bulk messages, the data that is sent from one cluster device should match the data that the other cluster device expects. This can be ensured by ordering the list of vertices on each cluster device in the same way. Thus, the receiving cluster device knows which remote vertex the first bulk entry belongs to, the second bulk entry, and so forth. If list of vertices is not ordered, then more information in the bulk message would have to be sent, such as each entry indicating to which vertex/node identifier the entry information belongs.

Table A is an example of storing information about outgoing edges. In an embodiment, each cluster device creates and stores data about incoming edges. For example, based on the example in FIG. 4A, cluster device 420 creates and stores the following table:

TABLE B

| From Machine | Local Vertex List | Remote Vertex List |
|---|---|---|
| #1 | 5, 6 | 1, 2, 4 |
| #3 | . . . | . . . |

Table B is an edge information table that indicates incoming edges of nodes assigned to cluster device 420. The first column of Table B indicates a cluster device that is assigned nodes that are neighbors of some nodes assigned to cluster device 410. In this example, machine #1 corresponds to cluster device 410 and machine #3 corresponds to cluster device 430.

The second column identifies nodes that are assigned to cluster device 420 and that are neighbors of nodes assigned to other cluster devices. For example, nodes 5 and 6 are nodes assigned to cluster device 420 and are neighbors of nodes assigned to cluster device 410.

The third column identifies nodes that are assigned to another cluster device and that are neighbors of nodes assigned to cluster device 420. For example, nodes 1, 2, and 4 are assigned to cluster device 410 and are neighbors of nodes 5 and 6, which are assigned to cluster device 420.

Therefore, in an embodiment, each cluster device stores information about outgoing edges and incoming edges. In an embodiment where edges are not directed, then separate tables for different types of edges (i.e., incoming and outgoing) are not necessary since no edge is a directed edge.

Expected Bulk Data Location

In an embodiment, edge information is augmented to include "expected bulk data location information." A bulk message that cluster device 410 sends to cluster device 420 may have node property information about each of nodes 1, 2, and 4, which are assigned to cluster device 410. Such node property information may be required by cluster device 420 in order to perform a graph analysis operation on nodes assigned to cluster device 420.

Expected bulk data location information that is stored at one cluster device is data that indicates a location, within a bulk message generated by another cluster device, where node/edge information is (or is to be) stored. For example, a bulk message from a first cluster device to a second cluster device may have information about a node property of each of one thousand nodes. To prevent the second cluster device from having to scan the bulk message each time for each of the one thousand nodes, the second cluster device stores expected bulk data location information that indicates where a remote node's property data is stored within the bulk message.

For example, a cross edge information table (such as Table B) may be updated (e.g., the third column) to indicate '0' for remote node 1, '1' for remote node 2, and '2' for remote node 4.

Alternatively, a neighbor array is updated to include the expected bulk data location data. For example, at cluster device 420, an entry in a neighbor array for remote node 1 (which is a neighbor of node 6) is updated to include '0' and a cluster device identifier that identifies cluster device 410 (i.e., the cluster device to which remote node 1 is assigned); an entry in the neighbor array for remote node 2 (which is a neighbor of node 5) is updated to include '1' and a cluster device identifier that identifies cluster device 410; and an entry in the neighbor array for remote node 4 (which is neighbor of node 5) is updated to include '2' and a cluster device identifier that identifies cluster device 410.

Then, when cluster device 420 determines that information about neighbors of node 5 is required (e.g., while processing a computation kernel), a neighbor array is analyzed to determine that information about nodes 2 and 4 (which are assigned to cluster device 410) will be found in the second and third locations of a bulk transfer message from cluster device 410.

In a related embodiment, expected bulk data location information is stored in a column-oriented array that corresponds to a neighbor array. Each entry in the column-oriented array corresponds to an entry in the neighbor array and indicates a position in a (e.g., to-be-generated, at least initially) bulk message that stores property data, such as a node property or an edge property.

Kernel Information

As noted previously, a cluster device may generate a bulk message proactively, i.e., not in response to a request from any other cluster device. For example, when a user creates a computation kernel that includes one or more graph analysis operations to perform, a user provides input that specifies one or more criteria for a bulk message. For example, the input may indicate: (1) that one or more (or all) cluster devices should create a bulk message; (2) which node and/or edge property is to be included in the bulk message; and, optionally, (3) whether the contents of the bulk message are for incoming edges or outgoing edges. For example, when composing the following computation kernel:

```
foreach(n: G.nodes)        // for every vertex n in graph G
   foreach(t: n.inNbrs)    // for every incoming neighbor vertex t of n
      n.foo += t.bar       // add up t.bar into n.foo
``` a user may specify the following:
  Use: PROACTIVE_BULK_READ
  Use: INCOMING EDGE
  Use: property <bar> for reading
Thus, a cluster device that processes the foregoing user input identifies outgoing edges of nodes that are assigned to the cluster device, since such outgoing edges are "incoming"

edges of nodes that are assigned to other cluster device(s). The cluster device generates one or more bulk messages, one for each other cluster device that is assigned nodes that are outgoing edges of nodes assigned to the cluster device.

Bulk Transfer

At the beginning of a computation kernel, each cluster device in a cluster generates a bulk message and transfers a bulk message to each other cluster device, e.g., using a cross edge information table, such as Table A. For example, based on a determination that other cluster nodes need node information of incoming edges, cluster device 410 identifies nodes that have outgoing edges to cluster devices 420 and 430 and generates a bulk message for set of nodes with outgoing edges to cluster devices 420 and 430. Thus, cluster device 410 creates a bulk message for each of cluster devices 420 and 430.

Figure 4B:
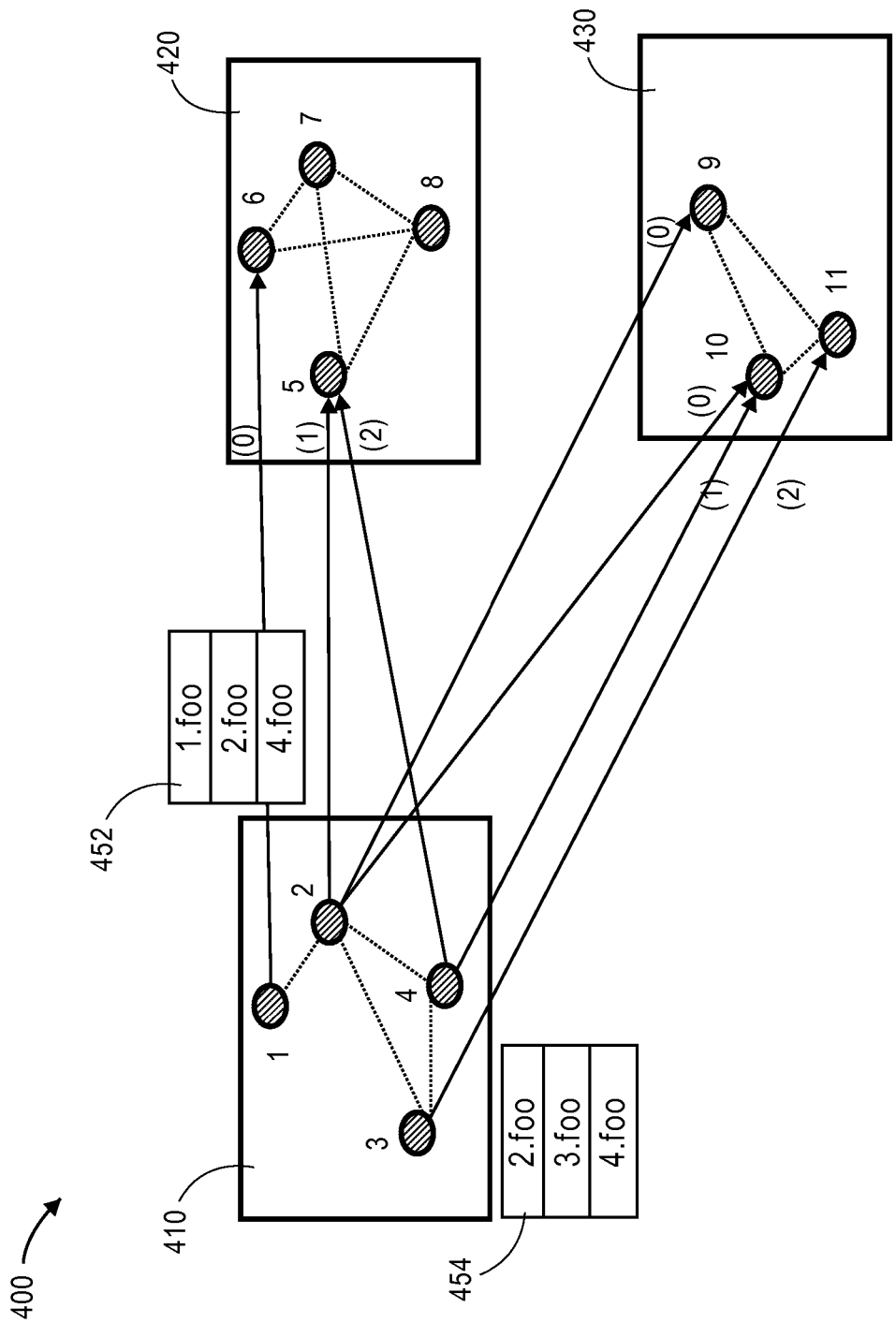
FIG. 4B is a block diagram that depicts example bulk messages in a cluster, in an embodiment.

Continuing with the example of FIG. 4A, FIG. 4B is a block diagram that depicts example bulk messages in cluster 400, in an embodiment. Cluster device 410 creates at least two bulk messages: 452 and 454. Bulk message 452 includes information (1) about nodes assigned to cluster device 410 (2) that may be needed by cluster device 420. Specifically, bulk message 452 includes node property "foo" for each of nodes 1, 2, and 4. Similarly, bulk message 454 includes information (1) about nodes assigned to cluster device 410 (2) that may be needed by cluster device 430. Specifically, bulk message 454 includes node property "foo" for each of nodes 2-4.

Remote Reading

A first cluster device executes a computation kernel that involves reading node property data of remote neighbors of local nodes assigned to the first cluster device. The first cluster device reads node property data from a bulk message that was generated by a second cluster device that is assigned nodes that are neighbors of nodes that are local to the first cluster devices. For example, cluster device 420 reads bulk message 452 when processing a computation kernel that involves nodes 5-6. Specifically, cluster device 420 determines, based on expected bulk data location information (whether stored in a cross edge information table, in a neighbor array, or in association with a neighbor array), that node 5 is connected to node 1 and that node 1 is at location '0' in bulk messages from cluster device 410. Consequently, cluster device 420 reads the 'foo' property from the first entry in bulk message 452.

Because a cluster device may be assigned to nodes that have neighbors that are assigned to different cluster nodes, the cluster device may access multiple bulk messages when executing a computation kernel. Given a previous example above, cluster device 420 may not only receive bulk message 452 from cluster device 410, cluster device 420 may also receive a bulk message (not depicted) from cluster device 430. Thus, when iterating over other nodes (not depicted) assigned to cluster device 420 (i.e., other than nodes 5-8), cluster device 420 may access the other bulk message, which would contain information about incoming edges to nodes assigned to cluster device 420.

In an embodiment, a cluster device includes multiple CPUs, each of which has access to a single bulk message. For example, a first CPU of cluster device 420 may iterate over neighbors of node 5 while a second CPU of cluster device 420 may iterate over neighbors of node 6. Each CPU access bulk message 452 to determine a node property value of a remote node. For example, the second CPU accesses the first position of bulk message 452 (because the second CPU iterates over neighbors of node 6) while the first CPU accesses the second and third portion of bulk message 452 (because the first CPU iterates over neighbors of node 5).

Request Buffers

A first cluster device may receive a bulk message transferred from another cluster device after the first cluster device begins executing a computation kernel that involves reading node property data of remote neighbors of local nodes. Thus, information that is stored remotely to the first cluster device may not be available when the first cluster device initially requests the information.

Figure 5A:
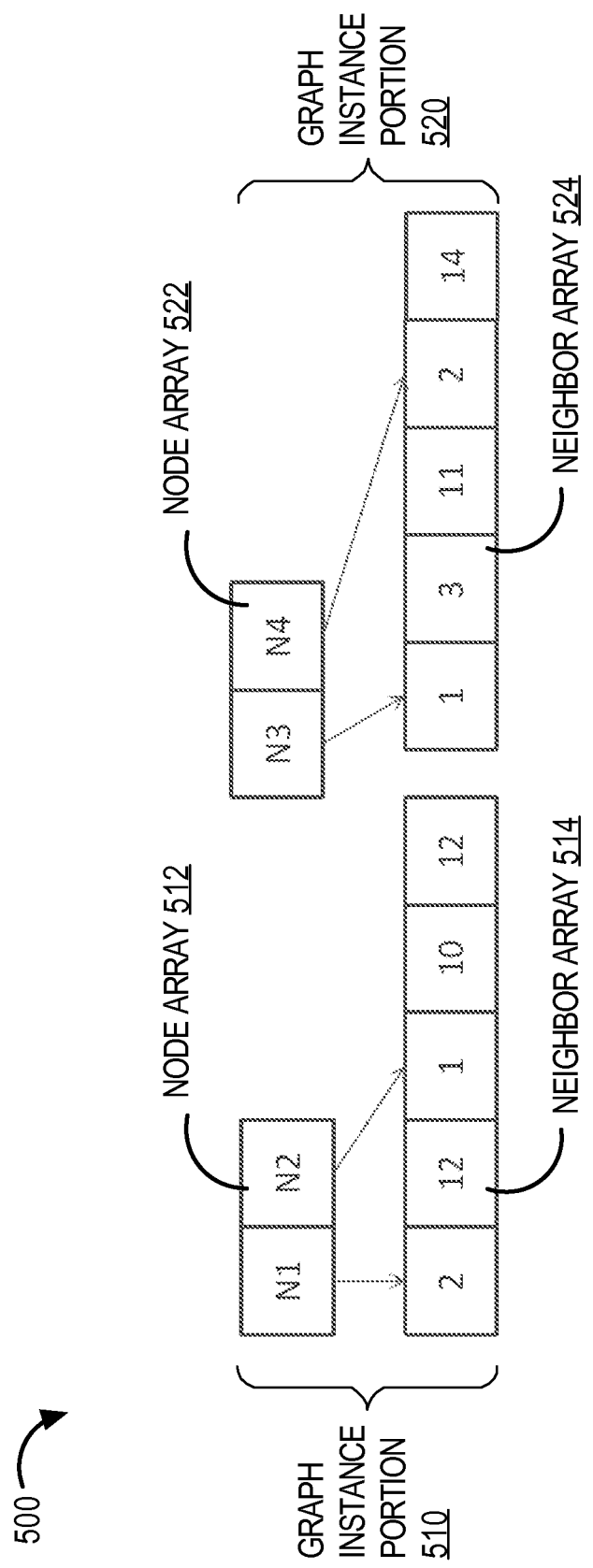
FIG. 5A is a block diagram that depicts two portions of a graph instance, in an embodiment.

Therefore, in an embodiment, a cluster device generates a context object for each of one or more neighbors and iterates over the generated context objects. FIG. 5A is a block diagram that depicts two portions of a graph instance 500, in an embodiment. Graph instance portion 510 is assigned to one CPU and includes a node array 512 and a neighbor array 514. Graph instance portion 520 is assigned to another CPU and includes a node array 522 and a neighbor array 524.

Thus, a first CPU processes nodes N1 and N2 while a second CPU processes nodes N3 and N4. In this example, node N1 has two incoming neighbors: B2 and B12. Node N2 has three incoming neighbors: B1, B10, and B12.

In this example, all neighbors are remote: remote neighbors B1-B3 are assigned to machine M1 while remote neighbors B10-B14 are assigned to machine M2.

When iterating over each neighbor, each CPU requests a remote read. If a bulk message containing the requested data is not yet available, then each remote read request is buffered in a data structure, referred to herein as a "request buffer." A request buffer may be generated for each CPU and for each destination cluster device (or machine).

Figure 5B:
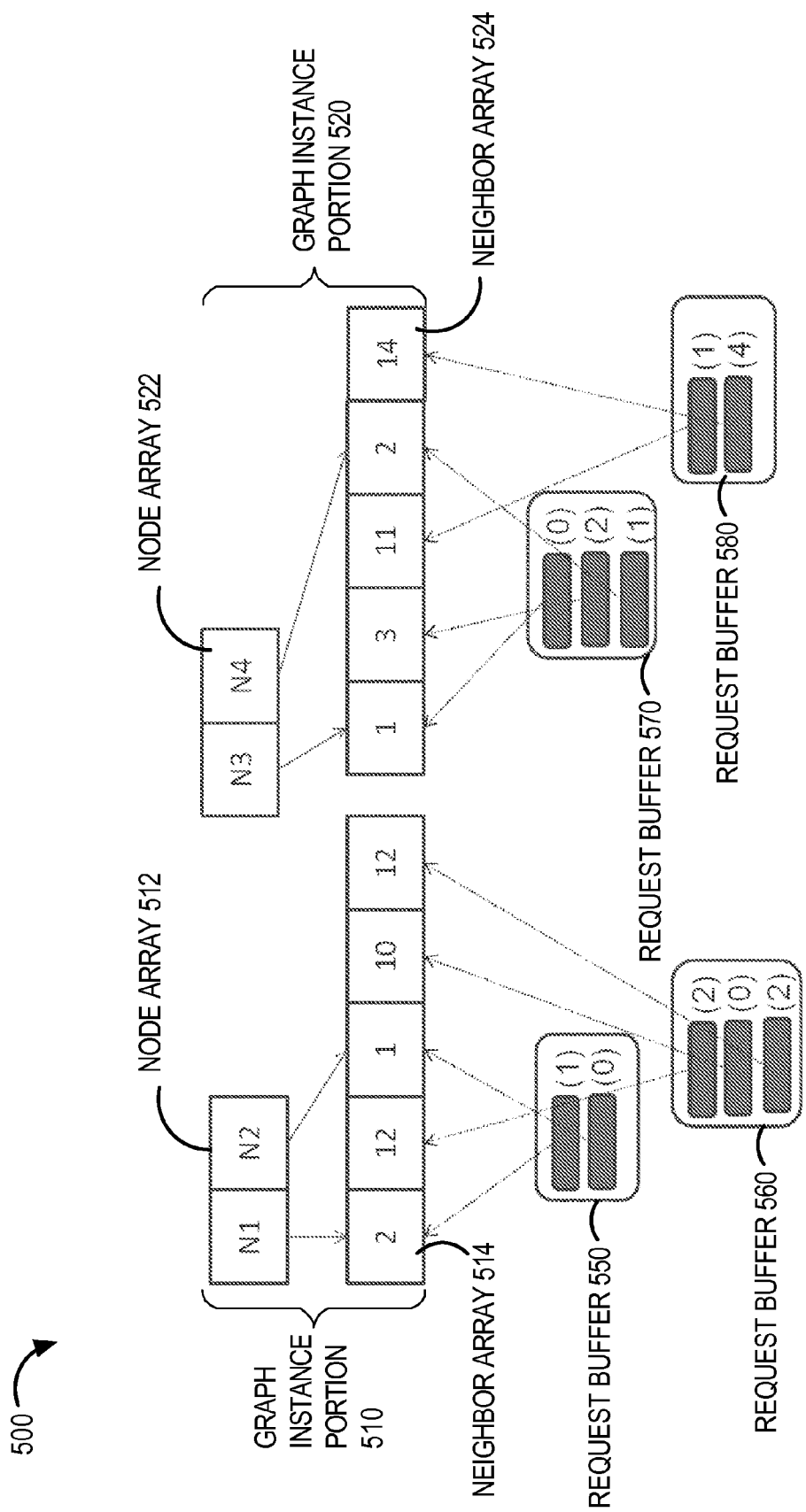
FIG. 5B is a block diagram that depicts multiple request buffers in relation to portions of a graph instance, in an embodiment.

FIG. 5B is a block diagram that depicts multiple request buffers 550-580, in an embodiment. Request buffer 550 is created for the first CPU and includes information from machine M1. Request buffer 560 is created for the first CPU and includes information from machine M2. Request buffer 570 is created for the second CPU and includes information from machine M1. Request buffer 580 is created for the second CPU and includes information from machine M2.

Each request buffer includes one or more data item pairs. Each data item pair includes a pointer to a content object (or neighbor) and an index to the target data in a bulk message (which may not yet exist). The index (or "destination" index) in a data item pair may be retrieved from the expected bulk data location information, described previously.

For example, request buffer 550 includes two data item pairs. One data-item pair points to neighbor B2 and indicates '1' as the destination index. The other data-item pair points to neighbor B12 and indicates '0' as the destination index.

After one or more request buffers are generated and after a bulk message is received, the one or more request buffers are processed. Thus, the arrival of a bulk message at a cluster device may trigger one or more CPUs of the cluster device to process one or more request buffers that pertain to the bulk message.

Figure 5C:
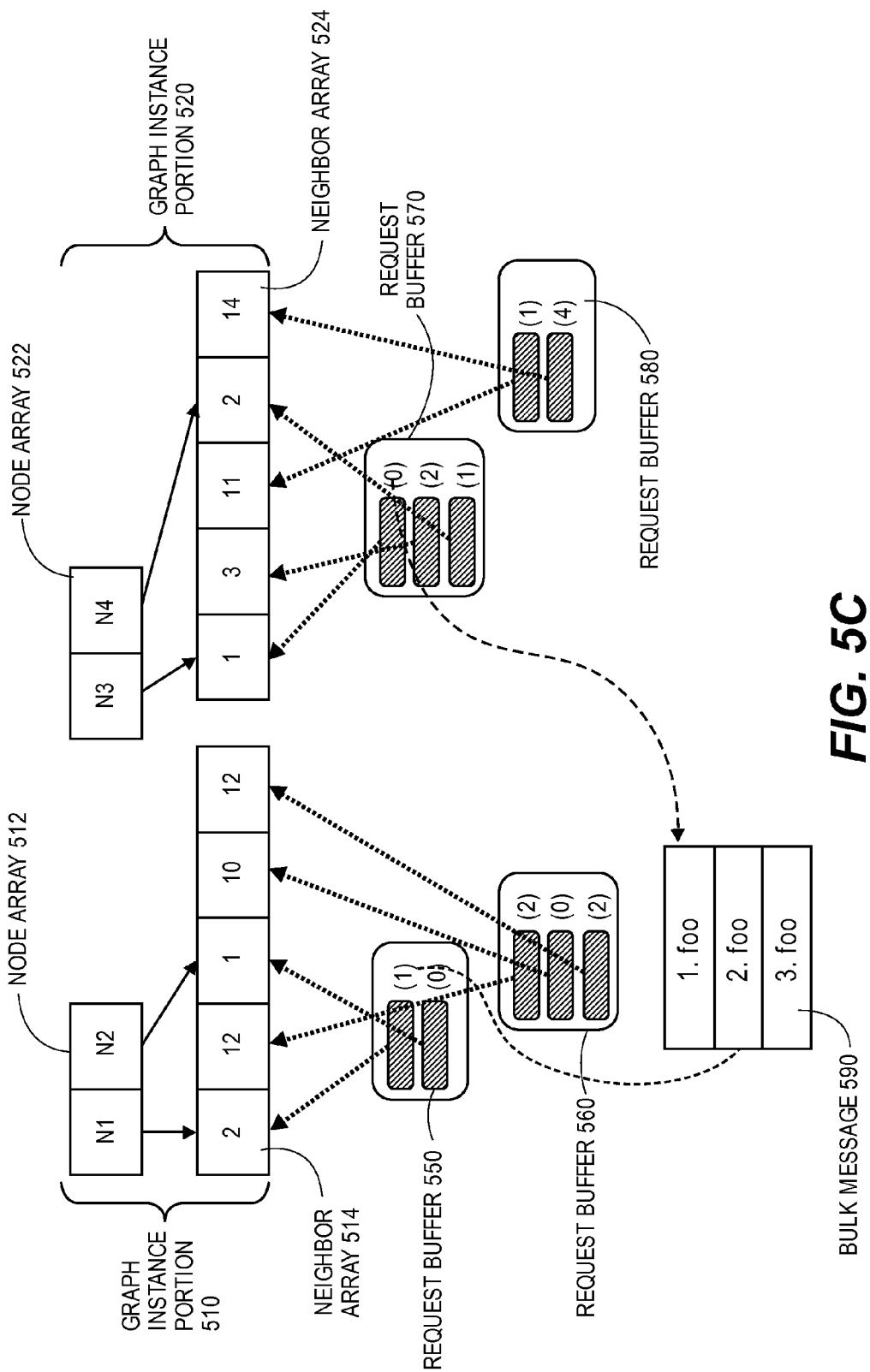
FIG. 5C is a block diagram that depicts how request buffers may be used to process a bulk message, in an embodiment.

FIG. 5C is a block diagram that depicts how request buffers 550-580 may be used to process a bulk message 590, in an embodiment. A cluster device receives bulk message 590 from another cluster device. Bulk message 590 includes node property data for neighbors B1-B3. Request buffer 550 includes two data item pairs and, thus, two destination indexes. The first CPU accesses request buffer 550 and determines that node property information for the first data item pair is located at position '1' (or is the second entry) in bulk message 590. The first CPU loads the node property information (i.e., B2.foo) from that location in bulk message 590 and processes the corresponding context (i.e., neighbor B2 in this example) with the node property information.

The first CPU also uses request buffer 550 to determine that node property information for the second data item pair is located at position '0' (or is the first entry) in bulk message 590. The first CPU loads the node property information (i.e., B1.foo) from that location in bulk message 590 and processes the corresponding context (i.e., neighbor B1 in this example) with the node property information.

Similarly, request buffer 570 includes three data item pairs and, thus, three destination indexes. The second CPU accesses request buffer 570 and determines that node property information for the first data item pair is located at position '0' (or is the first entry) in bulk message 590. The second CPU loads the node property information (i.e., B1.foo) from that location in bulk message 590 and processes the corresponding context (i.e., neighbor B1 in this example) with the node property information.

Again, the second CPU accesses request buffer 570 and determines that node property information for the second data item pair is located at position '2' (or is the third entry) in bulk message 590. The second CPU loads the node property information (i.e., B3.foo) from that location in bulk message 590 and processes the corresponding context (i.e., neighbor B3 in this example) with the node property information.

Fragmenting Bulk Read

In some situations, there may be a limit on the size of a bulk message, such as 64 MB. Therefore, in an embodiment, a bulk message is fragmented (or split) into multiple parts. Thus, instead of sending one large bulk message from a first cluster device to a second cluster device, the first cluster device sends multiple, smaller bulk messages. In this embodiment, the second cluster device may buffer up remote requests, not only on a per cluster device basis, but also on a per fragment basis. For example, a CPU on cluster device 420 creates a first remote buffer for a first fragment from cluster device 410, a second remote buffer for a second fragment from cluster device 410, and so forth.

A cluster device may calculate a number of fragments that the cluster device expects to receive. For example, cluster device 420 determines that 1,239 nodes assigned to cluster device 410 are neighbors of nodes assigned to cluster device 420. For example, cluster device 420 uses Table B to identify incoming nodes from cluster device 410. The data required to store 1,239 data items (e.g., of 8- or 32-bytes each) in a single bulk message may be larger than a cluster communication threshold. Thus, cluster device 420 creates multiple bulk messages, each sized based, for example, on the cluster communication threshold. Thus, cluster device 420 may calculate that four bulk message fragments will be received from cluster device 410 and that the first three bulk message fragments from cluster device 410 will be 10 MB and that the last bulk message fragment from cluster device 410 will be 3 MB.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
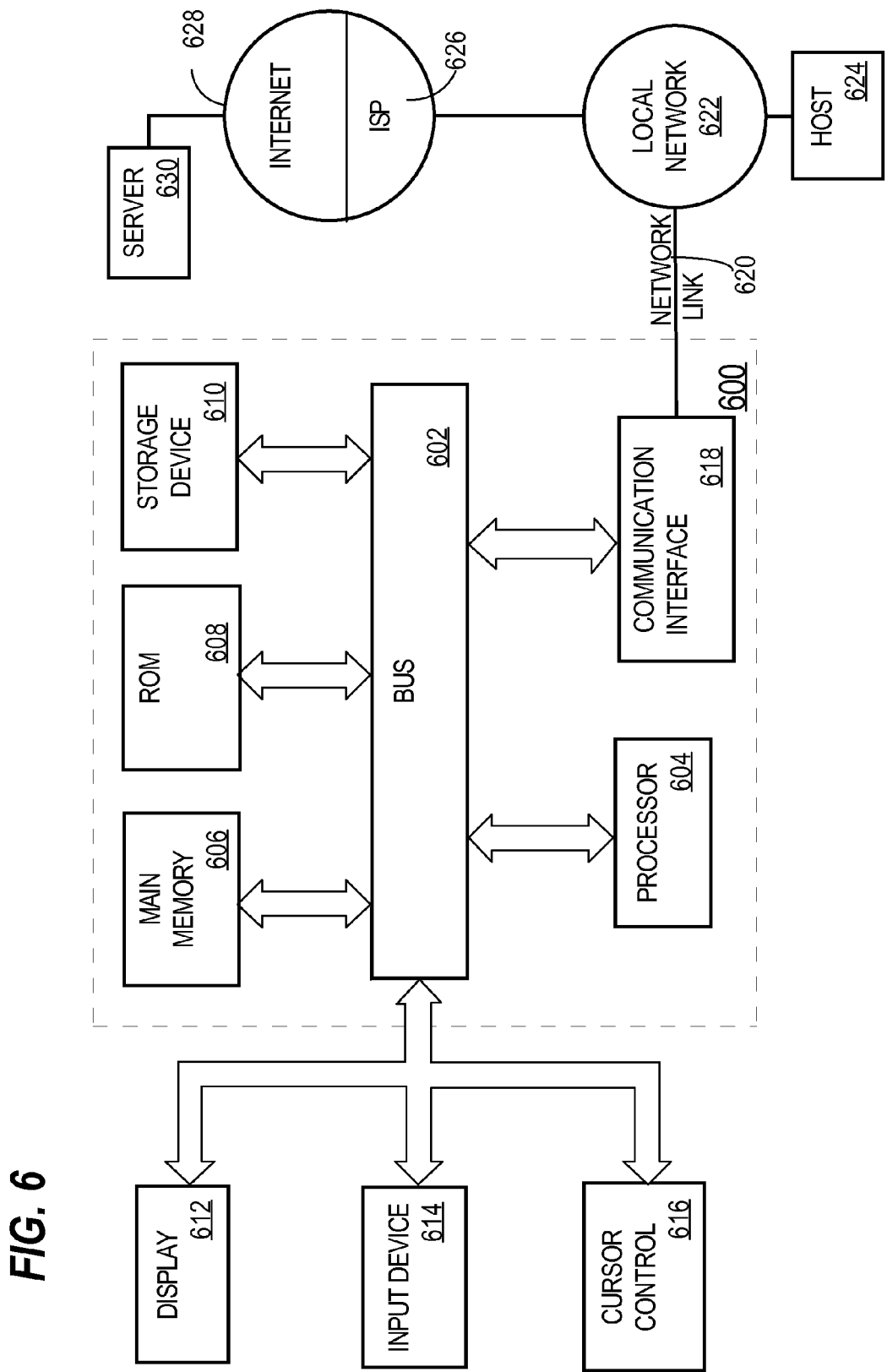
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hardwired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   storing, at a second cluster device, a list that indicates a plurality of nodes, of a distributed graph, that are assigned to a first cluster device that is different than the second cluster device, wherein the list also includes position data that corresponds to each node of the plurality of nodes;
   receiving, from the first cluster device, at the second cluster device, a first message that is a bulk message and that includes a property value of each node in the plurality of nodes that are assigned to the first cluster device;
   while processing a particular node, of the distributed graph, at the second cluster device:
      determining, from the position data in the list, a first position associated with a first node identifier that identifies a first node that is connected to the particular node in the distributed graph;
      based on the first position, identifying a first location in the first message;
      identifying a first property value that is stored at the first location in the first message;
      processing the particular node based on the first property value of the first node;
   while processing the particular node at the second cluster device:
      determining, from the position data in the list, a second position associated with a second node identifier that identifies a second node that is connected to the particular node in the distributed graph;
      based on the second position that is different than the first position, identifying a second location in the first message;
      identifying a second property value that is stored at the second location in the first message;
      processing the particular node based on the second property value of the second node;
   wherein the method is performed by one or more computing devices.

2. The method of claim 1, further comprising:
   receiving input, specified by a user, that indicates a bulk read;

wherein receiving the first message comprises receiving the first message only in response to receiving the input.

3. The method of claim 2, wherein the input also indicates a particular node property of which the property value is a type.

4. The method of claim 2, wherein:
the input also indicates whether edges of certain nodes represent outgoing edges or incoming edges;
the certain nodes (a) are assigned to the first cluster device and (b) have one or more node property values to be retrieved from the first cluster device.

5. The method of claim 1, wherein graph data of the distributed graph is stored in persistent storage and the plurality of nodes represent a portion of the distributed graph, are generated based on the graph data, and are stored in memory of the first cluster device.

6. The method of claim 1, further comprising:
storing, at the second cluster device, a second list that identifies a second plurality of nodes, of the distributed graph, that are assigned to a third cluster device that is different than the first cluster device and the second cluster device.

7. The method of claim 1, wherein:
the plurality of nodes is a first plurality of nodes;
storing the list comprises storing the list in association with a second list that identifies a second plurality of nodes, of the distributed graph, that are assigned to the second cluster device;
each of the second plurality of nodes is connected to at least one of the nodes in the first plurality of nodes.

8. The method of claim 1, further comprising, prior to receiving the first message:
receiving, from persistent storage, at the second cluster device, a first portion of graph data of the distributed graph;
wherein the first cluster device receives a second portion, of the graph data, that is different than the first portion;
creating the list based on the second portion of the graph data.

9. The method of claim 1, the method further comprising:
prior to receiving the first message, generating and storing a first request for the first property value of the first node, wherein the first request indicates the first location within the first message.

10. The method of claim 9, wherein:
a third node in a second plurality of nodes is assigned to a third cluster device that is different than the first cluster device and the second cluster device;
the method further comprising:
prior to receiving a second message from the third cluster device, generating and storing a second request for a third property value of the third node, wherein the second request indicates a third location within the second message;
after receiving the second message, processing the particular node by using the second request to identify the third location within the second message and identity the third property value of the second node based on the second location.

11. The method of claim 1, wherein the plurality of nodes is less than all the nodes that are assigned to the first cluster device.

12. A method comprising:
storing, at a first cluster device in a cluster of a plurality of cluster devices, information about a first plurality of nodes, of a distributed graph, that are assigned to the first cluster device, wherein a second plurality of nodes of the distributed graph are assigned to a second cluster device that is different than the first cluster device;
identifying multiple nodes in the first plurality of nodes, wherein the multiple nodes are a subset of the first plurality of nodes;
storing, in a bulk message, a property value of each node in the multiple nodes;
after storing, in the bulk message, the property value of each node in the multiple nodes, sending the bulk message from the first cluster device to the second cluster device;
wherein the method is performed by one or more computing devices.

13. One or more storage media storing instructions which, when executed by one or more processors, cause:
storing, at a second cluster device, a list that indicates a plurality of nodes, of a distributed graph, that are assigned to a first cluster device that is different than the second cluster device, wherein the list also includes position data that corresponds to each node of the plurality of nodes;
receiving, from the first cluster device, at the second cluster device, a first message that is a bulk message and that includes a property value of each node in the plurality of nodes that are assigned to the first cluster device;
while processing a particular node, of the distributed graph, at the second cluster device:
determining, from the position data in the list, a first position associated with a first node identifier that identifies a first node that is connected to the particular node in the distributed graph;
based on the first position, identifying a first location in the first message;
identifying a first property value that is stored at the first location in the first message;
processing the particular node based on the first property value of the first node;
while processing the particular node at the second cluster device:
determining, from the position data in the list, a second position associated with a second node identifier that identifies a second node that is connected to the particular node in the distributed graph;
based on the second position that is different than the first position, identifying a second location in the first message;
identifying a second property value that is stored at the second location in the first message;
processing the particular node based on the second property value of the second node.

14. The one or more storage media of claim 13, wherein the instructions, when executed by the one or more processors, further cause:
receiving input, specified by a user, that indicates a bulk read;
wherein receiving the first message comprises receiving the first message only in response to receiving the input.

15. The one or more storage media of claim 14, wherein the input also indicates a particular node property of which the property value is a type.

16. The one or more storage media of claim 14, wherein:
the input also indicates whether edges of certain nodes represent outgoing edges or incoming edges;

the certain nodes (a) are assigned to the first cluster device and (b) have one or more node property values to be retrieved from the first cluster device.

17. The one or more storage media of claim 13, wherein graph data of the distributed graph is stored in persistent storage and the plurality of nodes represent a portion of the distributed graph, are generated based on the graph data, and are stored in memory of the first cluster device.

18. The one or more storage media of claim 13, wherein the instructions, when executed by the one or more processors, further cause:
storing, at the second cluster device, a second list that identifies a second plurality of nodes, of the distributed graph, that are assigned to a third cluster device that is different than the first cluster device and the second cluster device.

19. The one or more storage media of claim 13, wherein:
the plurality of nodes is a first plurality of nodes;
storing the list comprises storing the list in association with a second list that identifies a second plurality of nodes, of the distributed graph, that are assigned to the second cluster device;
each of the second plurality of nodes is connected to at least one of the nodes in the first plurality of nodes.

20. The one or more storage media of claim 13, wherein the instructions, when executed by the one or more processors, further cause, prior to receiving the first message:
receiving, from persistent storage, at the second cluster device, a first portion of graph data of the distributed graph;
wherein the first cluster device receives a second portion, of the graph data, that is different than the first portion;
creating the list based on the second portion of the graph data.

21. The one or more storage media of claim 13, wherein the instructions, when executed by the one or more processors, further cause:
prior to receiving the first message, generating and storing a first request for the first property value of the first node, wherein the first request indicates the first location within the first message.

22. The one or more storage media of claim 21, wherein:
a third node in a second plurality of nodes is assigned to a third cluster device that is different than the first cluster device and the second cluster device;
the instructions, when executed by the one or more processors, further cause:
prior to receiving a second message from the third cluster device, generating and storing a second request for a third property value of the third node, wherein the second request indicates a third location within the second message;
after receiving the second message, processing the particular node by using the second request to identify the third location within the second message and identity the third property value of the second node based on the second location.

23. The one or more storage media of claim 13, wherein the plurality of nodes is less than all the nodes that are assigned to the first cluster device.

24. The method of claim 1, further comprising:
generating, at the second cluster device, a request for one or more nodes;
sending the request from the second cluster device to the first cluster device;
wherein the first cluster device generates and sends the first message in response to receiving the request.

25. The method of claim 1, wherein the list further comprises information pertaining to non-neighboring nodes of the plurality of nodes.

26. The method of claim 12, wherein the property value of each node corresponds to an attribute of an object that each node represents.

* * * * *

UNITED STATES PATENT AND TRADEMARK OFFICE
CERTIFICATE OF CORRECTION

PATENT NO. : 10,459,978 B2  
APPLICATION NO. : 14/678358  
DATED : October 29, 2019  
INVENTOR(S) : Hong et al.

Page 1 of 1

It is certified that error appears in the above-identified patent and that said Letters Patent is hereby corrected as shown below:

On the Title Page

In Column 1, Item (54) under title, Lines 1-4, delete "DISTRIBUTED GRAPH PROCESSING SYSTEM THAT SUPPORT REMOTE DATA READ WITH PROACTIVE BULK DATA TRANSFER" and insert -- A DISTRIBUTED GRAPH PROCESSING SYSTEM THAT SUPPORTS REMOTE DATA READ WITH BULK DATA TRANSFER --, therefor.

In the Specification

In Column 1, under title, Lines 1-4, delete "DISTRIBUTED GRAPH PROCESSING SYSTEM THAT SUPPORT REMOTE DATA READ WITH PROACTIVE BULK DATA TRANSFER" and insert -- A DISTRIBUTED GRAPH PROCESSING SYSTEM THAT SUPPORTS REMOTE DATA READ WITH BULK DATA TRANSFER --, therefor.

In Column 1, Line 5, below "TRANSFER" insert  
-- CROSS-REFERENCE TO RELATED APPLICATIONS; BENEFIT CLAIM  
This application is related to U.S. Application Ser. No. 14/619,414, filed Feb. 11, 2015, the entire contents of which is hereby incorporated by reference as if fully set forth herein. --.

Signed and Sealed this  
Sixteenth Day of February, 2021

Drew Hirshfeld  
*Performing the Functions and Duties of the*  
*Under Secretary of Commerce for Intellectual Property and*  
*Director of the United States Patent and Trademark Office*